Patented May 19, 1925.

1,538,861

UNITED STATES PATENT OFFICE.

WILLIAM G. LINDSAY, OF NEWARK, NEW JERSEY.

PYROXYLIN COMPOSITION.

No Drawing.   Application filed July 2, 1923.   Serial No. 649,172.

*To all whom it may concern:*

Be it known that I, WILLIAM G. LINDSAY, citizen of the United States, residing at Newark, in the county of Essex and State of New Jersey, have invented certain new and useful Improvements in Pyroxylin Compositions, of which the following is a specification.

This invention relates generally to cellulose and similar compositions which may be employed in the form of films, sheets, blocks or articles of any desired shape and which may likewise be employed as varnishes, lacquers and dopes.

Among the objects of my invention is to produce a composition of the above character which when in solid or dry form shall possess a high degree of toughness and strength. One advantage of such toughness and strength is that it permits the incorporation into the composition of relatively large quantities of fillers, pigments or other foreign material without detracting from the other desirable characteristics of the composition.

Other objects of my invention will be particularly pointed out hereafter and still further objects and advantages will be apparent from the following description.

My improved composition comprises a cellulose compound and a plasticizing agent consisting of a compound represented by

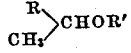

where R represents an aliphatic radical preferably $C_2H_5$ and R' represents hydrogen or an organic group such as an alphyl group, an acyl group or an aryl group. Among the latter compounds I find secondary butyl acetate particularly suitable for my purpose although in certain cases other fatty acid esters may be used, such as those formed of the combination of secondary butyl radical and acetic, propionic, butyric or caproic acid radicals.

When the embodiment of my invention is a varnish or lacquer the following ingredients and proportions give excellent results: Pyroxylin, preferably containing 10.85 to 11.65 per cent nitrogen, 100 parts; urea, or other ant-acid if desired, 1 part; camphor or substitutes, such as triphenylphosphate or tricresly phosphate, 0 to 50 parts or more (usually 10 to 30 parts for coatings on a wood or metal); secondary butyl acetate, 25 to 200 or more parts.

Sufficient quantity of following: Ethyl acetate, 0 to 400 or more parts (preferably about 250 parts); ethyl alcohol, 0 to 200 or more parts (preferably 50 to 75 parts); benzol, 0 to 150 parts (preferably 25 to 50 parts).

The above proportions are merely illustrative and may be changed to suit varying conditions as will be apparent to one skilled in the art. For many purposes I find that a pyroxylin which is readily flowable in a 10% solution of acetone gives the most satisfactory results, although I do not wish to limit myself to the use of this particular variety. Other solvents and solvent combinations may be used, such as methyl alcohol, acetone, ethyl methyl ketone, the so-called methyl acetone and similar pyroxylin solvents. The choice of such solvents will depend not only upon the characteristics which it is desired that the composition shall have, but also in a large measure on the market price of the solvents.

The advantages of acetate of secondary butyl alcohol over acetate solvent made from fusel oil and known as amyl acetate are that with many varieties of pyroxylin the former can be used in small proportions also with some varieties it dissolves the pyroxylin more rapidly than amyl acetate. The vapours of acetate of secondary butyl alcohol (in drying the coatings, etc.) do not irritate and choke as much as amyl acetate and it is not "suffocating" in use to the same extent as is amyl acetate. It evaporates more rapidly and more completely without deleterious effects, which is a distinct advantage in lacquers, dopes, varnishes, etc.

When it is desired to form a plastic mass the following ingredients and proportions may be employed: Pyroxylin, 100 parts; camphor or tricresylphosphate or equivalent, 20 to 60 parts or more; secondary butyl acetate, 2½ to 12½ parts or more; ant-acid, volatile solvents, etc., quantity sufficient; pigments, etc., quantity sufficient.

If desired instead of the secondary butyl acetate alone a mixture of secondary butyl acetate and secondary butyl alcohol may be employed.

The above constituents are worked up to a dough like mass on rolls or by other suitable means and subsequently formed into the desired shape and seasoned.

The use of the acetate of secondary butyl alcohol is not limited to use as a solvent for cellulose compounds merely, as the same may be employed as a solvent for or in connection with rosins, gums, lacquers, etc.

I claim:

1. A composition comprising pyroxylin and a plasticizing agent therefor comprising a fatty acid ester of secondary butyl alcohol.

2. A varnish comprising pyroxylin and a fatty acid ester of secondary butyl alcohol.

3. A composition comprising pyroxylin containing 10.85 to 11.65% nitrogen and a plasticizing agent therefor comprising secondary butyl acetate.

4. A composition comprising 100 parts pyroxylin and an excess of 25 parts secondary butyl acetate.

5. A composition comprising pyroxylin, plasticized by a mixture of an aromatic phosphate, a fatty acid ester of secondary butyl alcohol and a volatile solvent.

6. A liquid coating composition comprising pyroxylin and a solvent therefor comprising secondary butyl acetate.

7. A liquid coating composition comprising pyroxylin approximately 100 parts, tricresylphosphate 50 parts or less, secondary butyl acetate 25 parts or more, and a volatile solvent 700 parts or less.

8. A composition comprising pyroxylin approximately 100 parts, tricresylphosphate 10 to 30 parts, secondary butyl acetate 25 to 200 parts ethyl acetate approximately 250 parts, ethyl alcohol 50 to 75 parts and benzol 25 to 50 parts.

9. A liquid coating composition comprising pyroxylin, a solvent therefor comprising secondary butyl acetate and urea.

10. A composition comprising pyroxylin and a plasticizing agent therefor comprising a compound

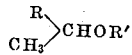

where R is an aliphatic radical and R' is an acyl group.

11. A composition comprising pyroxylin plasticized by a mixture comprising an aromatic ester, and a compound

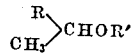

where R is an aliphatic radical and R' is an acyl group.

12. A liquid coating composition comprising pyroxylin approximately 100 parts, tricresylphosphate 50 parts or less, secondary butyl acetate in excess of 2½ parts and a volatile solvent.

WILLIAM G. LINDSAY.